D. K. WERTMAN.
Harness.

No. 207,922. Patented Sept. 10, 1878.

UNITED STATES PATENT OFFICE.

DANIEL K. WERTMAN, OF MOUNT CARMEL, PENNSYLVANIA.

IMPROVEMENT IN HARNESS.

Specification forming part of Letters Patent No. 207,922, dated September 10, 1878; application filed August 9, 1878.

*To all whom it may concern:*

Be it known that I, DANIEL K. WERTMAN, of Mount Carmel, in the county of Northumberland and State of Pennsylvania, have invented a new and useful Improvement in Harness, of which the following is a specification:

My invention relates to that part of a harness called the "holdback;" and it consists in a novel arrangement and combination of thill-straps, a hip-strap, and a pad, whereby the weight and pressure are distributed more uniformly over the body of the horse, and greater freedom of motion is permitted than by the employment of the breeching heretofore in common use.

Figure 2:
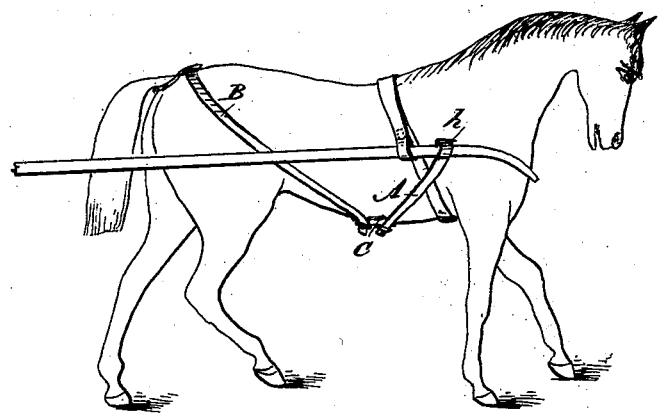
Figure 1:
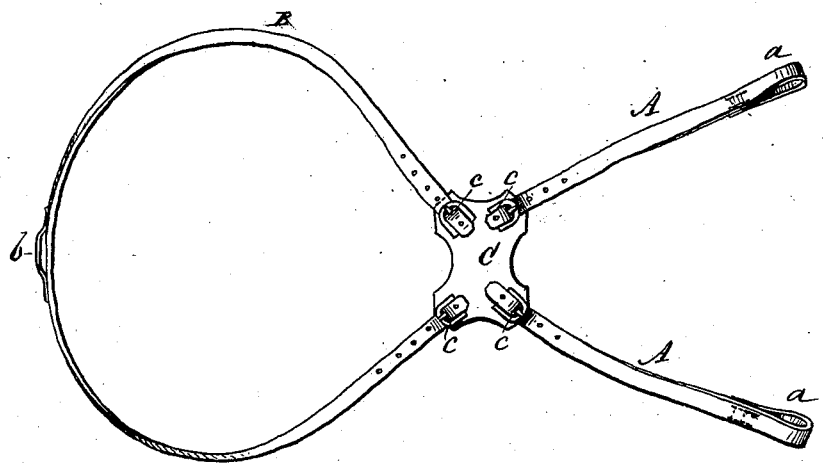

In the accompanying drawing, Figure 1 is a view of my improved holdback, and Fig. 2 a representation of the manner of applying the same.

Similar letters of reference indicate corresponding parts.

A A represent the thill-straps; B, the hip-strap, and C the pad. The thill-straps each have a loop, $a$, at one end, for the passage of the thill, and the other end is adapted for engagement with a buckle.

The hip-strap is made of sufficient width to prevent pain or inconvenience to the horse, and of sufficient length to allow it to rest on the hips near the root of the tail and extend on both sides of the animal to a point under his belly, and the ends of the straps are adapted for engagement with buckles.

The pad is of such size as to fit comfortably under the belly, slightly in rear of the point occupied by the ordinary belly-band. The pad may be round, oval, or angular, as desired; but it is preferably of approximate oblong angular outline, with buckles $c$ at its four corners.

The ends of the two thill-straps are attached to two of the buckles on the pad, and the ends of the hip-strap are attached to the other two buckles. The improved holdback is then in the form shown in Fig. 1, and is applied to the animal by placing the hip-strap B on the hips and the pad C under the belly and passing the thills through the loops $a$ of the thill-straps A A, as shown in Fig. 2.

The thills are provided with hooks $h$, which prevent the thill-straps from slipping too far back on the thills.

The hip-strap is provided with a loop or keeper, $b$, midway of the length of said strap. When the parts are in place on the animal the crupper belonging to the harness is passed through the loop or keeper $b$, and thus helps to hold the hip-strap in place.

The parts being in the position shown in Fig. 2, when the horse is in the act of "holding back" the pad C is pressed upward against the belly and the hip-strap is pressed downward on the hips, thus distributing the pressure more uniformly and exerting it in a more natural manner than when the ordinary breeching is employed.

This invention possesses many advantages. It is easily and quickly adjusted and detached. It is perfectly safe when attached to the thills. It allows perfect freedom of action to the limbs and hind quarters of the horse at all times. It fits snugly and easily on the body of the animal without any of the slack required in the breeching heretofore in use. It prevents chafing, pulling together of the hind quarters, knuckling, tripping, interfering, and various other disadvantages resulting from the use of the ordinary breeching. Instead of raising the horse off his hind feet, it has a tendency to press downward on the hips and hind quarters and increase the security of the animal's footing.

This holdback can be attached to double harness as well as to single harness by simply buckling the ends of the thill-straps to the tugs of the double harness.

If the hip-strap should break, the thill-straps will prevent the vehicle from running up against the horse, as they pass from the thills to the pad under the belly, and the forward movement of the thills is limited by the hooks $h$. This arrangement also obviates the necessity for an outside belly-band, as in the ordinary harness.

Having thus described my invention, I claim as new and desire to secure by Letters Patent—

A holdback consisting of thill-straps A A, a hip-strap, B, and a pad, C, arranged and connected with each other substantially in the manner and for the purpose herein described.

DANIEL K. WERTMAN.

Witnesses:
GEO. E. MOSER,
WM. HINKE.